United States Patent
Rajadurai et al.

(10) Patent No.: US 8,577,414 B2
(45) Date of Patent: Nov. 5, 2013

(54) METHOD AND APPARATUS FOR CREATING SECURITY CONTEXT AND MANAGING COMMUNICATION IN MOBILE COMMUNICATION NETWORK

(75) Inventors: Rajavelsamy Rajadurai, Bangalore (IN); Beom-Sik Bae, Suwon-si (KR); Han-Na Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 92 days.

(21) Appl. No.: 13/388,273

(22) PCT Filed: Jul. 30, 2010

(86) PCT No.: PCT/KR2010/005055
§ 371 (c)(1),
(2), (4) Date: Jan. 31, 2012

(87) PCT Pub. No.: WO2011/014043
PCT Pub. Date: Feb. 3, 2011

(65) Prior Publication Data
US 2012/0129500 A1    May 24, 2012

(30) Foreign Application Priority Data

Jul. 31, 2009    (IN) .......................... 1818/CHE/2009

(51) Int. Cl.
*H04B 1/38*    (2006.01)
*H04M 1/00*    (2006.01)

(52) U.S. Cl.
USPC ........ 455/558; 455/411; 455/435.1; 455/419; 455/41.1

(58) Field of Classification Search
USPC ............. 455/558, 41.1, 41.2, 435.1, 419, 411
See application file for complete search history.

(56) References Cited

U.S. PATENT DOCUMENTS

| | | | |
|---|---|---|---|
| 6,615,057 B1 * | 9/2003 | Pettersson | ...................... 455/558 |
| 2004/0180657 A1 | 9/2004 | Yaqub et al. | |
| 2007/0004457 A1 * | 1/2007 | Han | .............................. 455/558 |
| 2008/0081611 A1 | 4/2008 | Hoyt et al. | |
| 2009/0041250 A1 | 2/2009 | Park et al. | |

OTHER PUBLICATIONS

International Search Report dated Mar. 31, 2011 in connection with International Patent Application No. PCT/KR2010/005055.
Written Opinion of International Searching Authority dated Mar. 31, 2011 in connection with International Patent Application No. PCT/KR2010/005055.

* cited by examiner

*Primary Examiner* — Vladimir Magloire (57) ABSTRACT

A method and apparatus for establishing communication between a plurality of communication devices and a communication network using a single subscription is provided. The method receives a first request from a second communication device to get a subscription identity and capabilities of subscription for accessing the communication network using subscription of the first communication device. The method then sends the first request to a Universal Subscriber Identity Module (USIM) associated with the first communication device. Thereafter, the method receives a response from the USIM including subscription identity, access protection keys and capabilities of the subscription. Then the method generates unique key for the second communication device based on the response received from the USIM. The method then sends the response along with the generated unique key to the second communication device to establish communication between the second communication device and the communication network using the subscription of first communication device.

28 Claims, 6 Drawing Sheets

METHOD AND APPARATUS FOR CREATING SECURITY CONTEXT AND MANAGING COMMUNICATION IN MOBILE COMMUNICATION NETWORK

CROSS-REFERENCE TO RELATED APPLICATION(S)

The present application claims priority under 35 U.S.C. §365 to International Patent Application No. PCT/KR2010/005055 filed Jul. 30, 2010, entitled "METHOD AND APPARATUS FOR CREATING SECURITY CONTEXT AND MANAGING COMMUNICATION IN MOBILE COMMUNICATION NETWORK". International Patent Application No. PCT/KR2010/005055 claims priority under 35 U.S.C. §365 and/or 35 U.S.C. §119(a) to Indian Patent Application Nos. filed 1818/CHE/2009 filed Jul. 31, 2009 and 1818/CHE/2009 filed Jul. 28, 2010 and which are incorporated herein by reference into the present disclosure as if fully set forth herein.

TECHNICAL FIELD

The present invention, in general, relates to field of mobile communication technology and more specifically to a field of security of User Equipment (UE) functionality split scenario in a third generation (3G) mobile communication technology.

BACKGROUND ART

Today, UE are equipped with various hardware and software that enables users of the UEs to access various services such as multimedia services, 3rd Generation Partnership Project (3GPP) services and the Internet services from their UEs. For example, the users may use a UE to access 3GPP services. The UEs may be separate mobile communication devices or embedded in the household devices. Examples of the UEs include but are not limited to, Liquid Crystal Display (LCD) televisions, LED televisions, Digital Cameras (DC), Personal Computer (PC), mobile communication devices and Personal Digital Assistants (PDA). The UEs are associated with appropriate client software, radio protocols, a separate module containing radio protocols and other elements that enables the UEs to access 3GPP services.

For accessing 3GPP service, the user of the UE can subscribe with the 3GPP network and thereafter the 3GPP network provides with necessary information like subscription identity, master key for further key generation, and module to derive unique keys to access 3GPP services. Hence, the UE for example a LCD television with necessary subscription information can initially register itself with the 3GPP network and can thereafter use the 3GPP network to watch High Definition (HD) video which is provided by the 3GPP services.

However, the use of the 3GPP services in such UEs are very minimal and not very often. For example, a user of the LCD television may want to view only a few football matches in HD using the 3GPP services. Thus, for watching few matches in HD, the users have to unnecessarily register and subscribe the UEs with network and then use the services. Further, there may be a case where the user may also have a mobile communication device that is already subscribed with the 3GPP network. Hence, the user has to subscribe and register each UE separately with the 3GPP network to access the 3GPP services on the 3GPP enabled devices.

Generally, the UEs are subscribed to handle security issues in accessing the 3GPP services but this leads to unnecessary subscriptions information storage and huge amount of money wasted as each subscription is associated with specific amount of money and hardware modules. Currently, there is no mechanism available to share single subscription between different UEs to obtain 3GPP access so as to reduce the additional cost associated with the 3GPP access and reduce the usage of communication resources.

DISCLOSURE OF INVENTION

Technical Problem

Hence there exists a need to efficiently manage one 3GPP subscription with one or more UEs without affecting the security issues.

Solution to Problem

The present invention is designed to address at least the above-mentioned problems and/or disadvantages and to provide at least the advantages described below. Accordingly, an aspect of the present invention is to provide a method and apparatus for establishing communication between a plurality of communication devices and a communication network using a single subscription.

In accordance with an aspect of the present invention, a method for establishing communication between a plurality of communication devices and a communication network using a single subscription is provided. The method is performed at the first communication device. The method receives a first request from a second communication device to get a subscription identity and capabilities of subscription for accessing the communication network using subscription of the first communication device. The first request may include a device ID associated with the second communication device. The method then sends the first request to a Universal Subscriber Identity Module (USIM) associated with the first communication device. The USIM in the first communication device enables the first communication device to access the communication network. Thereafter, the method receives a response from the USIM including the subscription identity, access protection keys and capabilities of the subscription. Then the method generates a unique key for the second communication device based on the response received from the USIM. The method then sends the response along with the generated unique key to the second communication device. The response and the generated unique key are then used to establish communication between the second communication device and the communication network using the subscription of the first communication device.

In accordance with another aspect of the present invention, a method for establishing communication between a plurality of communication devices and a communication network using a single subscription is provided. The method is performed at a second communication device. The method includes sending a request to a first communication device to get a subscription identity and capabilities of a subscription for accessing the communication network using subscription of the first communication device. The request may include a device ID associated with the second communication device. The method then receives a response from the first communication device including the subscription identity and the capabilities of the subscription. A radio communication channel between the second communication device and the communication network is then established based on the subscription identity received in the response. Then the method generates a key specific to the second communication device using second communication device identity and keys derived during authentication procedures. Thereafter, the method establishes a secure communication between the second communication device and the communication network using the subscription of the first communication device based on the generated key specific to the second communication device.

In accordance with another aspect of the present invention, an apparatus for establishing communication between a plurality of communication devices and a communication network using a single subscription by a first communication device is provided. The apparatus comprises a transceiver to receive a first request from a second communication device to get a subscription identity and capabilities of a subscription associated with the first communication device for accessing the communication network, send the first request to a Universal Subscriber Identity Module (USIM) associated with the first communication device, and receive a response from the USIM including a subscription identity and the capabilities of the subscription. The apparatus also comprises a processor to generate a unique key for the second communication device based on the response received from the USIM, and send the response along with the generated unique key to the second communication device.

In accordance with another aspect of the present invention, an apparatus for establishing communication between a plurality of communication devices and a communication network using a single subscription by a second communication device is provided. The apparatus comprises a transceiver to send a request to a first communication device to get a subscription identity and capabilities of a subscription associated with first communication device for accessing the communication network, and receive a response includes a subscription identity and the capabilities of the subscription from the first communication device. The apparatus also comprises a processor to establish a radio communication channel between the second communication device and a communication network based on the subscription identity received in the response, generate a key specific to the second communication device using second communication device identity and keys derived during authentication procedures, and establish a secure communication between the second communication device and the communication network using the subscription of the first communication device based on the generated key specific to the second communication device.

Advantageous Effects of Invention

The present invention provide a method and apparatus for establishing communication between a plurality of communication devices and a communication network using a single subscription.

BRIEF DESCRIPTION OF DRAWINGS

The above and other aspects, features, and advantages of certain embodiments of the present invention will be more apparent from the following description taken in conjunction with the accompanying drawings, in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various embodiments of the present disclosure.

Throughout the drawings, it should be noted that like reference numbers are used to depict the same or similar elements, features, and structures.

MODE FOR THE INVENTION

The following description, with reference to the accompanying drawings, is provided to assist in a comprehensive understanding of certain embodiments of the present invention as will be defined by the claims and their equivalents. Although the description includes various specific details to assist in that understanding, these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness.

The terms and words used in the following description and claims are not limited to the dictionary meanings, but are merely used by the inventor to enable a clear and consistent understanding of the present invention.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 6, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
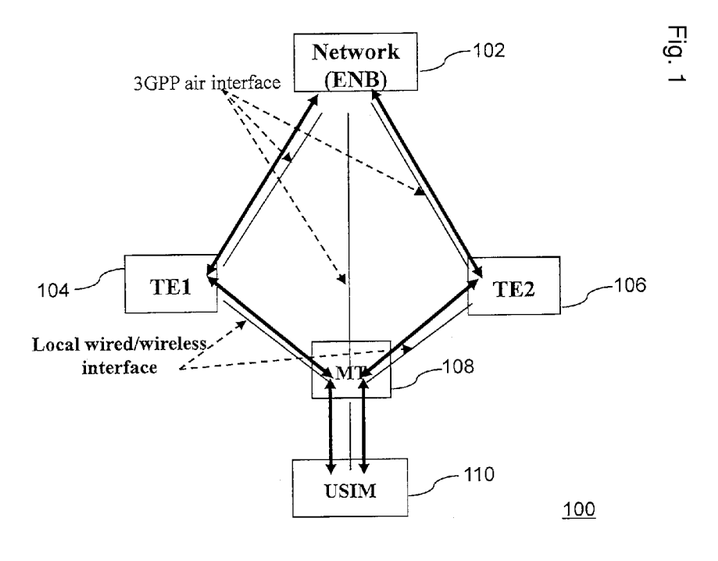
FIG. 1 illustrates an environment 100, where various embodiment of the present invention is practised.

FIG. 1 illustrates an environment 100, where various embodiment of the present invention is practised.

Referring to FIG. 1, a single subscription is shared between a plurality of communication devices to obtain 3GPP access. The environment 100 includes a 3GPP network, two Terminal Equipments (TEs) and one Mobile Terminal (MT). The 3GPP network 102 is shown to include an ENodeB that allows communication devices to access 3GPP network. The plurality of communication devices includes two Terminal Equipments (TE1 104 and TE2 106) and one Mobile Terminal (MT 108). The plurality of communication devices is capable of accessing 3GPP services and/or other communication technologies.

In an embodiment, the plurality of communication devices is the devices that can communicate using Wideband Code Division Multiple Access (WCDMA) technology, Long Term Evolution (LTE) technology, short range communication technologies like Bluetooth, Wireless Local Area Network (WLAN), Near Field Communication (NFC) and the like. In an embodiment, the three communication devices (the TE1 104, the TE2 106 and the MT 108) are capable of accessing 3GPP communication network through one or more E Node B, for example the ENB 102.

The TE1 104, the TE2 106 and the MT 108 access the ENB 102 using a 3GPP air interface. Further, the TE1 104, the TE2 106 and the MT 108 are connected with local wired or wireless interface. For example, communication devices can be connected with each other using short range wireless connectivity interface like Bluetooth. The MT 108 is associated with a Universal Subscriber Identity Module (USIM) 110 to access the 3GPP network. In an embodiment, the TE1 104 and the TE2 106 are capable of accessing the ENB using the subscription from the USIM 110 present in the MT 108. Thus, the plurality of communication can have simultaneous access to the 3GPP network using the single subscription. In an embodiment, a group based authentication can be performed and the subscription can be shared amongst the plurality of TEs.

The TE1 104, the TE 106 and the MT 108 shall be able to simultaneously communicate with the same ENB, or any access network using the same USIM 110. Thus for simultaneously accessing of the network by multiple TE using a single subscription along with security context creation and maintenance in mobile communication, the prerequisites are mentioned below.

The security requirements on local interface should be maintained. The local interface should be mutually authenticated and authorized. The authentication can be password based or can be done manually. The MT 108 should perform authorization with USIM 110 to access the 3GPP. To mitigate attacks on the local interface, the interface should be a secured interface. For the secured interface, the TE1 104 and the TE2 106 shall detect presence of MT and shall continue the session with the radio access network as long as the MT is in its vicinity or communication is possible.

In an embodiment, separate unique security keys are derived cryptographically for each devices (TE1 104 and TE2 106) using single or shared subscription. The unique key is generated per TE using Terminal Equipment Identity (TE ID) as input in key derivation function in the TE or in the MT and also in the network. The TE ID can be specific to a device and is unique for each device. The TE ID can be identified using unique standard form assigned by the 3GPP forum or in the form of International Mobile Equipment Identity (IMEI). Thereafter, mechanisms to verify and allow the TEs to access the 3GPP system credentials for 3GPP network access are performed. Also a mechanism to intimate the network that a request is for UE split/group functionality and to adopt procedure for UE split/group functionality is performed. Thereafter, the TEs are allowed to access the 3GPP network using single/shared subscription.

In an embodiment, Single Sign-On (SSO) method is used to access 3GPP system. This method uses existing SSO key for new TE attach (Single Sign-On). Further same Key Access Security Management Entries ($K_{ASME}$) a Key derived during EPS-AKA authentication, is used for all TEs accessing E-UTRAN, but unique Non Access Stratum (NAS), Access Stratum (AS) and UP keys are derived per TE using (Key Access Security Management Entity) which is derived from $K_{ASME}$, for example $K''_{ASME}$. The $K_{ASME}$ is generated during network access authentication or during re-authentication procedure in the MT 108 and in the network 102 or alternatively generated for the UE functionality split scenarios in the MT 108 and in the network 102.

In an embodiment, for UMTS Terrestrial Radio Access Network (U-TRAN), Ciphering Key (CK) and Integrity Protection Key (IK) generated during network access authentication or during re-authentication procedure are used to derive CK' and IK' per TE. In an example, a Key derivation function is shown below.

Derived key=HMAC-SHA-256 (Key, S),
S=FC∥P0∥L0∥P1∥L1∥P2∥L2∥ . . . ∥Pn∥Ln
FC=value according to the technology specifications
P0=algorithm type distinguisher
L0=length of algorithm type distinguisher (i.e. 0x00 0x01)
P1=algorithm identity
L1=length of algorithm identity (i.e. 0x00 0x01)
P2=Device Identity
L2=length of Device ID (i.e. 0x00 0x04)

Hence, the derived key is used to access 3GPP system by the TEs using shared or single subscription. The method is further explained in detail in conjunction with FIG. 2 and FIG. 3.

Figure 2:
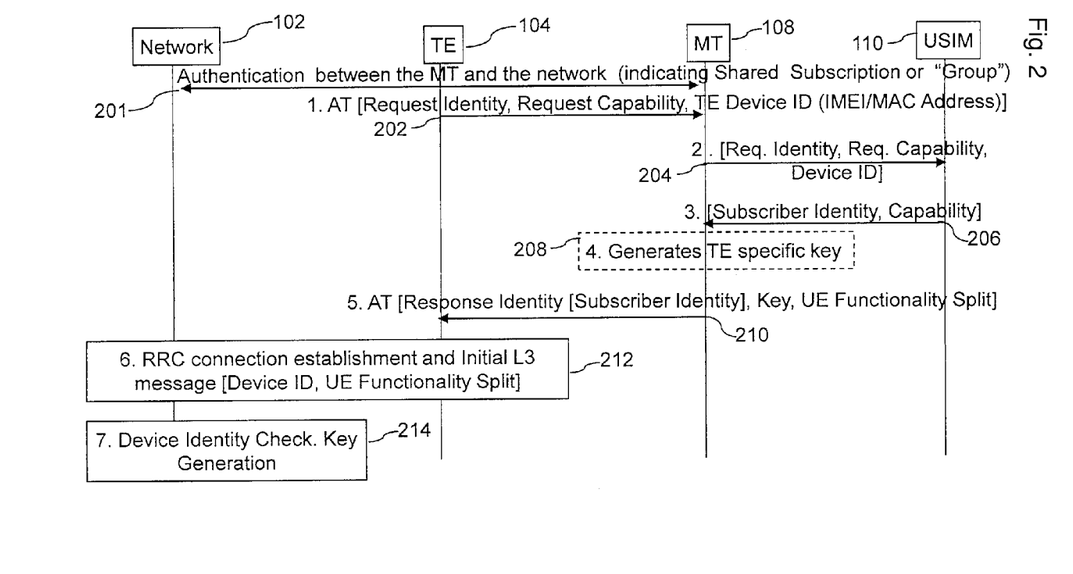
FIG. 2 illustrates a flow diagram illustrating a method for establishing communication between a plurality of communication devices and a communication network using a single subscription, in accordance with an embodiment of the present invention.

FIG. 2 illustrates a flow diagram illustrating a method for establishing communication between a plurality of communication devices and a communication network using a single subscription, in accordance with an embodiment of the present invention.

Referring to FIG. 2, at step 201 the MT 108 mutually authenticates with the network 102 and establishes the security association. For example authentication between the MT 108 and the network 102 indicates shared subscription or group. The TE 104 sends a request to the MT 108 at step 202. In an embodiment, the TE 104 detects the MT 108 through local interface. In an embodiment, The TE 104 sends the request message to the MT using ATtension (AT) command or any other local interface specific message to obtain Subscriber Identity (IMSI). The AT command is generally used to start a command line to be sent from the TE 104 to the MT 108. The AT command can also be used to send a command line from the TE 104 to MT 108.

In an embodiment, the AT command includes request for identity, capabilities and a device ID. Hence, the TE 104 can send its identity to the MT 108. The identity could be IMEI or device specific identity or identity allocated by the 3GPP system for the TE 104. The TE 104 may optionally request the capability of the USIM 110 to know whether USIM 110 supports UE functionality split, shared subscription or group authentication key derivation and capability to store context for multiple TEs. Hence, the TE 104 may send the request for identity, request for capability and its device ID in single AT command or in a multiple AT commands. For example, the AT command is AT [Request Identity, Request Capability, TE Device ID (IMEI/MAC Address)].

The MT 108 does authentication procedure with the TE 104 to allow or authorize USIM 110 access. The authentication procedure is optional. After successful authentication, security associations are established to secure the local interface communication between the MT 108 and the TE 104. At step 204, the MT 108 relay the request from the TE 104 to the USIM 110 along with the TE identity. The MT 108 may also request capabilities of the USIM 110 to know whether USIM supports UE functionality split, key derivation and capability to store context for multiple TEs. In an embodiment, the MT 108 may send the request for identity, request for capability and TE's device ID in a single message or it can be in multiple messages. In an embodiment, authentication and security association may be established between the TE 104 and the MT 108, before receiving the AT command from the TE 104.

In an embodiment, the USIM 110 optionally verify the authenticity of the TE 104 either by checking the TE ID in the preconfigured device list by the user or by the network or may by requesting the user to verify the same. After optional verification, at step 206, the USIM 110 returns identity of the subscription, for example IMSI or the temporary identity (stored for this device identity, if any) to the MT 108. In an embodiment, separate contexts are maintained for each TE in the USIM 110. If the USIM 110 is capable of storing and/or generating the keys for UE functionality split scenario, then USIM 110 will return the stored security context of the TE 104 to the MT 108. The stored security context may contain the keys, selected security algorithms and key index.

At step 208, the MT 108 generates unique key for each TE using the TE-ID as an input parameter in the key generation function using the Key $K_{ASME}$ generated during the MT authentication before or by running a separate AKA procedure for the case of "UE Functionality Split" or "Group Authentication" scenario or by using the security context received from the USIM 110. For example, the key can be derived using the following function.

Derived key=HMAC-SHA-256 (Key, S),
S=P0||L0||P1||L1||P2||L2|| . . . ||Pn||Ln
Where:
P0=Device Identity
L0=length of Device ID (for example 0x00 0x04)
For example $K''_{ASME}$(TE)=HMAC-SHA-256 ($K_{ASME}$, Device ID, . . . ), separate context is maintained for each TE in the MT. $K_{ASME}$ is generated during network access authentication or during re-authentication procedure in the MT and in the network. Alternatively, $K''_{ASME}$(TE)=HMAC-SHA-256 ($K_{ASME}$(UFS), Device ID, . . . ), where $K_{ASME}$ (UFS) is generated for the UE functionality split scenarios in the MT and in the network At step 210, the MT 108 sends the subscriber identity and the generated key to the TE 104, using the AT command. For example, the AT command is AT [Response Identity [Subscriber Identity], Key, UE Functionality Split]. The MT 108 may also include the indicator of "Functionality Split" or "Group" and send it to the network along with the AT message.

At step 212, the TE 104 initiates and completes the RRC connection establishment procedure and initiates the L3 message. The TE 104 inserts the subscriber identity and the indicator "UE Functionality Split" "Group" in L3 message and sends it to the network 102. The indication may be used in a separate indicator or in the realm part of APN. The TE 104 can also include optionally its device identity along with the message.

At step 214, the network 102 verifies authenticity of the TE 104 either by checking the TE ID in the preconfigured device list for the subscriber or alternatively requesting authorization from the MT. The network 102 then generates a unique key per TE (TE 104) using the TE-ID as an input parameter in key generation function when "Functionality Split" or "Group" indicator is present in the message.

Figure 3:
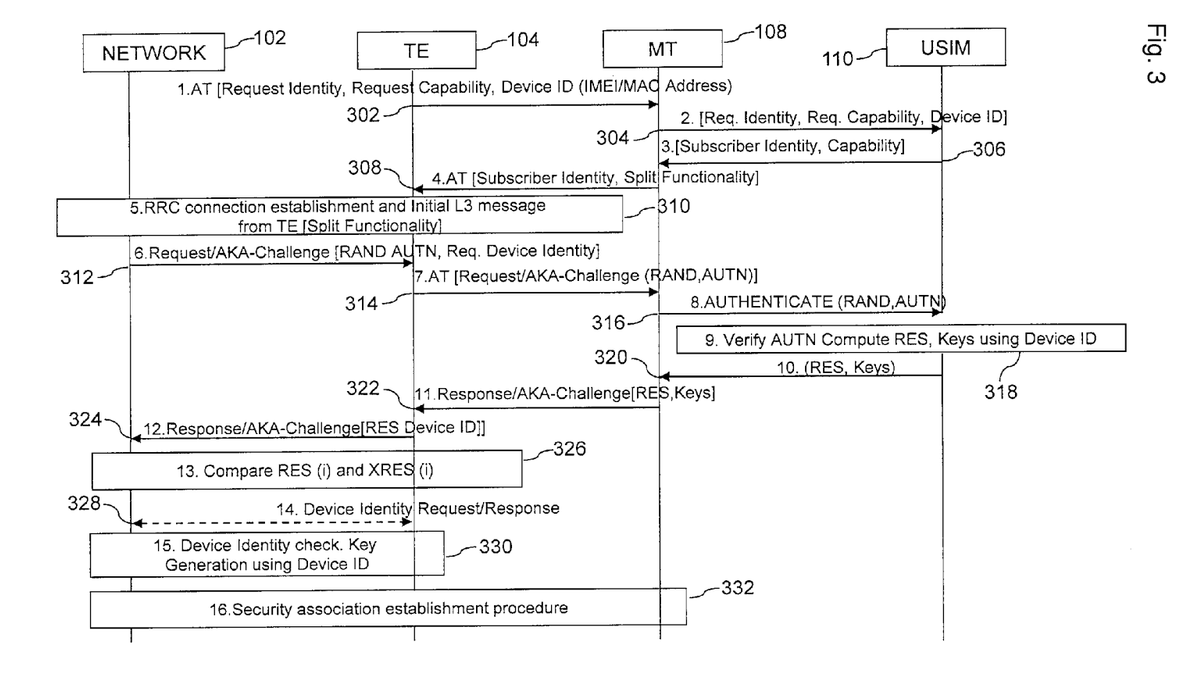
FIG. 3 illustrates a flow diagram illustrating a method for establishing communication between a plurality of communication devices and a communication network using a single subscription, in accordance with another embodiment of the present invention.

FIG. 3 illustrates a flow diagram illustrating a method for establishing communication between a plurality of communication devices and a communication network using a single subscription, in accordance with another embodiment of the present invention.

Referring to FIG. 3, at step 302 the TE 104 detects the MT 108 through local interface and thereafter sends a request message to the MT 108 using AT command to obtain subscriber identity, for example IMSI number. In an embodiment, the TE 104 sends its identity to the MT 108. The identity could be IMEI or device specific identity or identity specially allocated by the 3GPP system of the TE 104. The TE 104 may optionally request capabilities of the USIM 110 to know whether USIM 110 supports UE functionality split, key derivation and have capabilities to store context for multiple TEs. In an embodiment, the TE 104 may send a request for identity, a request for capabilities and the device ID in single AT command or in multiple AT commands.

At step 304, the MT 108 may optionally do authentication procedure with the TE 104 to allow USIM 110 access. After successful authentication, security associations can be established to secure local interface communication. The MT 108 relay the request from the TE 104 to the USIM 110 along with the TE device identity. The MT 108 may also request capabilities of the USIM 110 to know whether USIM 110 supports UE functionality support, key derivation and capability to store context for multiple TEs. The MT 108 may send the request for identity, request for capability and TE's device ID in a single message or it can be in multiple messages. In an embodiment, authentication and security association is established between the TE 104 and the MT 108 before the AT command is received from the TE 104.

In an embodiment, the USIM 110 may optionally verify the authenticity of the TE 104 either by checking the TE ID in the preconfigured device list by the user or by the network 102 or may even request the user to verify the same. After verification, the USIM 110 returns identity of the subscription (IMSI) or the temporary identity (stored for this device identity if any) to the MT 108.

At step 308, the MT 108 relays subscriber identity to the TE 104, using the AT command. The MT 108 can also include an indicator associated with "Functionality Split" to the network along with the AT message. The indicator may be using a separate indicator or a realm part of Access Point Name (APN). At step 310, the TE 104 initiates and completes RRC connection establishment procedure and initiates L3 message. The TE 104 inserts the subscriber identity and the indicator "Functionality Split" or "Group" in L3 message and sends it to the network 102.

At step 312, the network 102 initiates authentication process by sending AKA challenge message to the TE 104. The network 102 may optionally include the device identity request along with this message. At step 314, the TE 104 forwards the request to the MT 108 with all the parameters, using the AT command. At step 316, the MT 108 sends the authentication challenge to the USIM 110, using the AUTHENTICATE command. At step 318, the USIM 110 verifies the authentication (AUTN) received from network 102 and identifies keys for the TE 104. The USIM 110 can also generate a unique key per TE, for example the TE 104, using the TE-ID as an input parameter in key generation function if it has the capability to derive $K_{ASME}$. For example, the key can be derived using the following function.

Derived key=HMAC-SHA-256 (Key, S),
S=P0||L0||P1||L1||P2||L2|| . . . ||Pn||Ln
P0=Device Identity
L0=length of Device ID (i.e. 0x00 0x04)

For example: $K''_{AMSE}$(TE)=HMAC-SHA-256 (CK||IK, SN-ID, TE-ID)

At step 320, the USIM 110 replies with the calculated key(s) (CK & IK or $K''_{AMSE}$ (TE)). The USIM 110 sends a response (RES) to the MT 108. In an embodiment, the USIM 110 will store the key(s) of each TE if the USIM 110 is capable of storing and/or generating the keys for UE functionality split scenario.

At step 322, the response message is sent by the MT 108 to the TE 104 using the AT command, includes the RES and the key $K''_{AMSE}$(TE). In an embodiment, the MT 108 derives $K''_{AMSE}$(TE) and send it to the TE 104 if the USIM 110 does not have the capability to derive the $K''_{AMSE}$(TE). At step 324, the TE 104 forwards the response message to the network 102. The TE 104 may include the device identity if network 102 have requested for the device identity at step 312.

At step 326, the network 102 will check the validity of the RES and compute Medium Access Control (MAC) of the entire message received, comparing it with the received MAC. At step 328, the network requests and obtains the TE-ID from the TE 104 if the network 102 have not included the device identity request in the message sent at step 312.

At step 330, the network 102 may optionally verify authenticity of the TE 104 either by checking the TE ID in the preconfigured device list for the subscriber or alternatively requesting authorization from the MT 108. The network 102 then generates a unique key per TE using the TE-ID as an input parameter in key generation function if "Functionality Split" or "Group" indicator is present. The key can be derived using the following function.

Derived key=HMAC-SHA-256 (Key, S),
S=P0||L0||P1||L1||P2||L2|| . . . µPn||Ln
P0=Device Identity
L0=length of Device ID (i.e. 0x00 0x04)

For example: $K''_{AMSE}$(TE)=HMAC-SHA-256 (CK||IK, SN-ID, TE-ID)

At step 332, the TE 104 and network 102 then start security association negotiation and establish security context. There are two possible alternatives methods for Security Context handling. First method is a Control at MT. In this method, connectivity with the USIM and the MT should always be maintained. In the method, $K_{ASME}$ for all TEs are stored in MT 108 and/or in the USIM 110. Further, NAS security context can be stored in MT 108 and/or in the USIM 110 when TE 104 is in idle mode. Further, the key refresh can be done at MT 108 for all TEs. The TE's context(s) is identified using the IMSI (or temp IDs) and the terminal Device ID (TE-ID).

The second method is Control at TE. In the second method, the network 102, checks presence of USIM 110 by running 'AKA' at regular interval. Thereafter, the derived $K''_{ASME}$ is passed to TE 104 for further key derivation and key refresh procedure.

Figure 4:
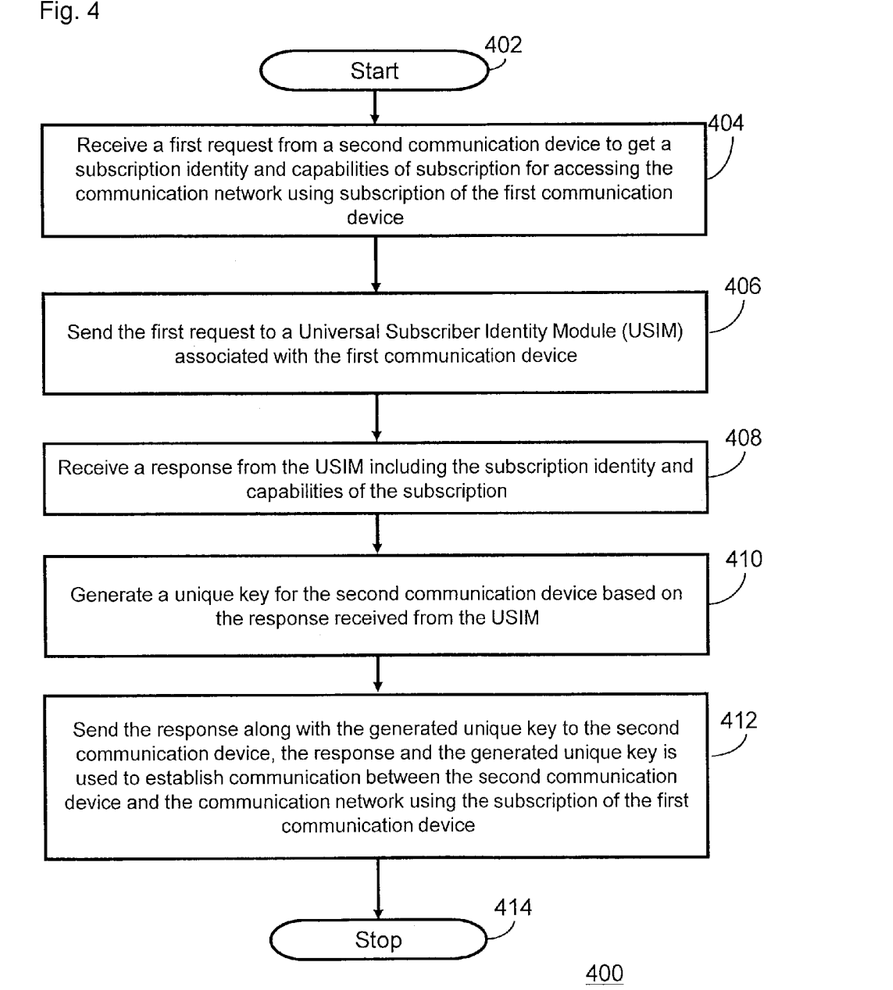
FIG. 4 is a flow chart illustrating a method for establishing communication between a plurality of communication devices and a communication network using a single subscription, in accordance with an embodiment of the present invention.

FIG. 4 is a flow chart illustrating a method for establishing communication between a plurality of communication devices and a communication network using a single subscription, in accordance with an embodiment of the present invention.

Referring to FIG. 4, the method 400 is initiated at step 402. In an embodiment, the method is performed at first communication device. In an embodiment, the first communication device is mobile communication terminal capable of accessing 3GPP network terminal. An example of first communication device is a mobile terminal, for example the MT 108. The communication network is a 3GPP network, for example the network 102.

At step 404, the first communication device receives a first request from a second communication device to get a subscription identity and capabilities of subscription for accessing the communication network using subscription of the first communication device. In an embodiment, the first request also includes a device identity associated with the second communication device. In an embodiment, the device identity of the second communication device is an International Mobile Equipment Identity (IMEI) number or a Medium Access Control (MAC) address of the second communication device. In an embodiment, the second communication device is an electronic device that is capable of accessing 3GPP network. In the environment 100, the second communication device is TE 104.

At step 406, the first request is sent to a Universal Subscriber Identity Module (USIM 110) associated with the first communication device 108, for example the USIM 110. The USIM enables the first communication device to access the communication network. At step 408, the first communication device receives a response from the USIM including the subscription identity and capabilities of the subscription. At step 410, a unique key is generated for the second communication device 104 based on the response received from the USIM 110.

At step 412, the response along with the generated unique key is sent to the second communication device 104. The response and the generated unique key are used to establish communication between the second communication device 104 and the communication network, for example the network 102 using the subscription of the first communication device 108. In an embodiment, the first communication device 108 can also authenticates with the network 102 on behalf of the plurality of communication device, for example the second communication device 104. The authentication with the communication network informs the network 102 about the plurality of communication devices that are associated with the first communication device 108 for communicating with the network 102.

In an embodiment, the communication network 102 supports a Universal Mobile Telecommunications System (UMTS) access technology and Long Term Evolution (LTE) access technology for communication. In the embodiment, the first communication device 108 communicates with the communication network 102 using UMTS access technology and second communication device 104 communicates with the communication network 102 using LTE access technology. At step 414, the method 400 is terminated.

Figure 5:
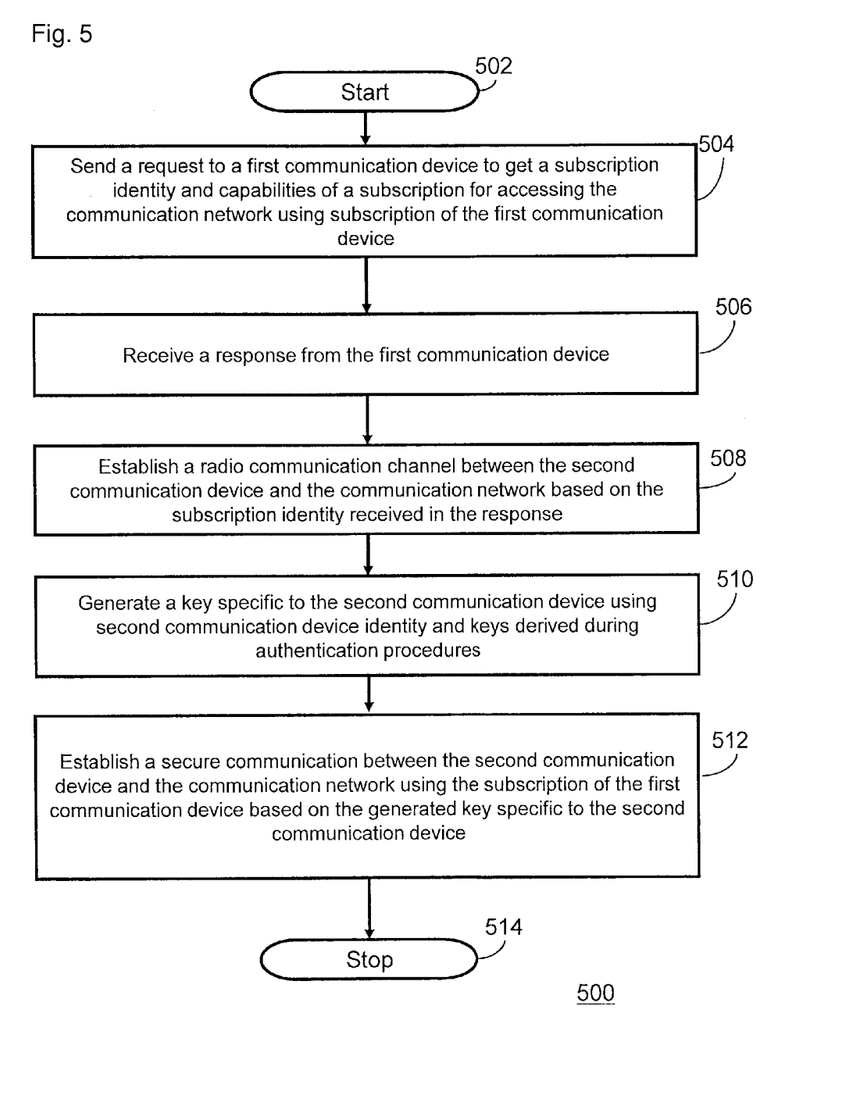
FIG. 5 is a flow chart illustrating a method for establishing communication between a plurality of communication devices and a communication network using a single subscription, in accordance with another embodiment of the present invention.

FIG. 5 is a flow chart illustrating a method for establishing communication between a plurality of communication devices and a communication network using a single subscription, in accordance with another embodiment of the present invention.

Referring to FIG. 5, the method 500 is initiated at step 502. In an embodiment, the method is performed at a second communication device. At step 504 a request to a first communication device is sent to get a subscription identity and capabilities of a subscription for accessing the communication network using subscription of the first communication device. The request can include a device identity associated with the second communication device. In an embodiment, the second communication device is an electronic device that is capable of accessing 3GPP network. In the environment 100, the second communication device is the TE 104.

In an embodiment, the first communication device is mobile communication terminal capable of accessing 3GPP network terminal. An example of first communication device is a mobile terminal, for example the MT 108. The communication network is a 3GPP network, for example the network 102.

At step 506, the second communication device 104 receives a response from the first communication device 108. The response includes the subscription identity and the capabilities of the subscription. At step 508, a radio communication channel between the second communication device 104 and the communication network 102 is established based on the subscription identity received in the response.

At step 510, a key specific to the second communication device 104 is generated using a second communication device identity and keys derived during authentication procedures. For deriving the keys during the authentication procedures the below method is performed. First a request is received from the communication network 102 for authentication of the second communication device 104. The request is then forwarded to the first communication device 108 to receive authentication parameters. Thereafter, the authentication parameters associated with establishing communication is received from the first communication device. Further, the authentication parameters are sent to the communication network 102 after performing authentication procedures with the communication network. The keys associated with the authentication procedures are then derived.

At step 512, a secure communication between the second communication device 104 and the communication network 102 is established using the subscription of the first communication device 108 based on the generated key specific to the second communication device 104. At step 514, the method 500 is terminated.

Figure 6:
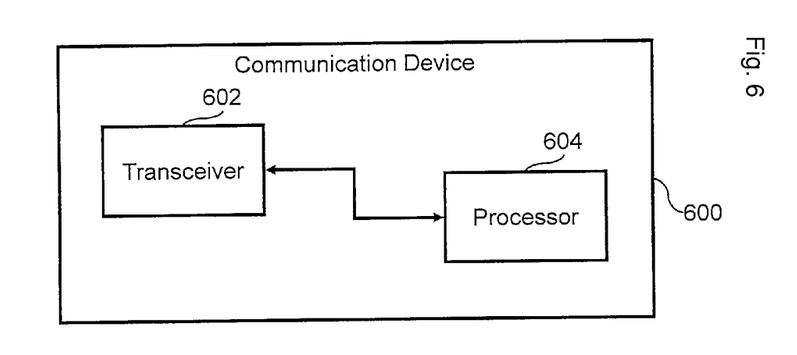
FIG. 6 illustrates a communication device, in accordance with an embodiment of the present invention.

FIG. 6 illustrates a communication device, in accordance with an embodiment of the present invention.

Referring to FIG. 6, a communication device 600 is provided. In an embodiment, the communication device 600 is a first communication device, for example the MT 108. The communication device 600 includes a transceiver 602 and a processor 604. The transceiver 602 is capable of receiving a first request from a second communication device to get a subscription identity and capabilities of subscription for accessing the communication network using subscription of the first communication device. In an embodiment, the first request includes a device ID associated with the second communication device.

The transceiver 602 in the first communication device 600 can also send the first request to a USIM, for example the USIM 110, associated with the first communication device 108. The USIM enables the first communication device to access the communication network. Thereafter, the transceiver 602 receives a response from the USIM including the subscription identity and capabilities of the subscription.

The processor 604 in the first communication device 600 is capable of generating a unique key for the second communication device based on the response received from the USIM. The processor 604 is also capable of sending the response along with the generated unique key to the second communication device, wherein the response and the generated unique key is used to establish communication between the second communication device and the communication network using the subscription of the first communication device.

In an embodiment, the communication device 600 is a second communication device 104. In this embodiment, transceiver 602 sends a request to a first communication device to get a subscription identity and capabilities of a subscription for accessing the communication network using subscription of the first communication device. The request can include a device ID associated with the second communication device. The transceiver 602 is also capable of receiving a response from the first communication device, wherein the response includes the subscription identity and the capabilities of the subscription.

In the embodiment, the processor 604 also establishes a radio communication channel between the second communication device and the communication network based on the subscription identity received in the response. The processor 604 further generates a key specific to the second communication device using second communication device identity and keys derived during authentication procedures. The processor 604 establishes a secure communication between the second communication device and the communication network using the subscription of the first communication device based on the generated key specific to the second communication device.

Exemplary embodiments of the present invention provide a method for establishing communication between a plurality of communication devices and a communication network using a single subscription. The method allows plurality of communication devices, which are capable of accessing 3GPP network, to communicate with the 3GPP network using a single subscription. The method reduces the subscription cost for the user as a device can access the 3GPP network using the subscription of other devices and subscription of each user is not required for accessing the network.

The method also reduces the overall accountability of the system as less number of subscriptions is done on the network. The method also provides a secure mechanism for allowing plurality of communication device to access the 3GPP network using one subscription and thus reduces the possibility of unauthorized access. The further advantages of sharing single subscription among the devices are listed as follows.

The method simplifies subscription handing in the network and also for the users, as the operator and the user do not need to have a dedicated subscription for the devices which are not used very often like camcorder (to upload photos and videos). Further a single service set will be available with the single subscription regardless of the subscriber's of mobile terminal capability, so single subscription have the ability to take advantage of any and all services provided by the operator like IPTV, data storage, internet access.

The method enhances USIM functionality as currently, access to the 3GPP network is allowed only in presence of USIM [2], so the Consumer Electronics (CE) and the Machine to Machine (M2M) devices need to have an USIM to gain 3GPP network access. The main difference between the usage of USIM in the mobiles and in the M2M devices are in their operational environments. Established USIM card technology needs to overcome major challenges to support the M2M devices. The challenges are that USIM is required to be more durable than ordinary USIM in order to reduce replacement and maintenance expenses, as to resistance to high humidity, corrosion and operability covering a wide temperature range.

Further, the implementation complexity is reduced. Also in order to mitigate the security threats of stolen and misused USIMs, USIMs need to be directly integrated within the CE and the M2M communicating module at manufacturing stage. Operator specific customization for this embedded card need to be performed either before or after the card has been incorporated into the device module. This initial provisioning of embedded USIM will afford greater inflexibility in managing subscriptions.

The method is also useful when the physical size of the CE and the M2M devices is very small in size compared to the size of the current USIM. In such a case, the current USIM cannot be used for such devices. Hence, it is necessary to bring down the size of the USIM to nearly size of head of a pin, as to embed it in the devices which are very small. Thus using the method the current size of the USIM can be easily used. The method also controls the overload by controlling signaling congestion and overload generated by large number of devices.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for establishing communication between a plurality of communication devices and a communication network using a single subscription, the communication network is a wireless or wired network, the method performed at a first communication device comprising:
receiving a first request from a second communication device to get a subscription identity and capabilities of a subscription for accessing the communication network, wherein the subscription is associated with the first communication device, wherein the first request includes a device identifier (ID) associated with the second communication device;
sending the first request to a Universal Subscriber Identity Module (USIM) associated with the first communication device, wherein the USIM enables the first communication device to access the communication network;
receiving a response from the USIM including the subscription identity, security parameters and the capabilities of the subscription;
generating a unique key for the second communication device based on the response received from the USIM; and
sending the response along with the generated unique key to the second communication device, wherein the response and the generated unique key are used to establish communication between the second communication device and the communication network using the subscription of the first communication device.

2. The method of claim 1, further comprising:
authenticating the first communication device mutually with the communication network on behalf of the plurality of communication devices, wherein authenticating with the communication network informs the communication network about the plurality of communication devices that are associated with the first communication device for communicating with the communication network.

3. The method of claim 1, wherein the first communication device is at least one of a mobile communication terminal, a fixed communication terminal and a gateway capable of accessing the communication network and the second communication device is at least one of an electronic device or machine type that is capable of accessing the communication network.

4. The method of claim 1, wherein the device ID of the second communication device is an International Mobile Equipment Identity (IMEI) number or a Medium Access Control (MAC) address or a unique ID assigned by the manufacturer of the second communication device.

5. The method of claim 1, wherein the communication network is at least one of a Universal Mobile Telecommunications System (UMTS) access network, Global System for Mobile Communications (GSM) access network, Worldwide Interoperability for Microwave Access (WiMAX), Code Division Multiple Access (CDMA) 2000, Next Generation Networks (NGN) and Long Term Evolution (LTE) access technology for communication.

6. The method of claim 1, wherein the communication network supports a Universal Mobile Telecommunications System (UMTS) access technology and Long Term Evolution (LTE) access technology for communication.

7. The method of claim 6, wherein the first communication device communicates with the communication network using UMTS access technology and the second communication device communicates with the communication network using LTE access technology.

8. A method for establishing communication between a plurality of communication devices and a communication network using a single subscription, the communication network is a wireless or wired network, the method performed at a second communication device comprising:
   sending a request to a first communication device to get a subscription identity and capabilities of a subscription for accessing the communication network, wherein the subscription is associated with the first communication device, wherein the request includes a device identifier (ID) associated with the second communication device;
   receiving a response from the first communication device, wherein the response includes the subscription identity and the capabilities of the subscription;
   establishing a radio communication channel between the second communication device and the communication network based on the subscription identity received in the response;
   generating a key specific to the second communication device using second communication device identity and keys derived during authentication procedures; and
   establishing a secure communication between the second communication device and the communication network using the subscription of the first communication device based on the generated key specific to the second communication device.

9. The method of claim 8, wherein the first communication device is at least one of a mobile communication terminal, a fixed communication terminal and a gateway capable of accessing the communication network and the second communication device is at least one of an electronic device or machine type that is capable of accessing the communication network.

10. The method of claim 8, wherein the device ID of the second communication device is an International Mobile Equipment Identity (IMEI) number or a Medium Access Control (MAC) address or a unique ID assigned by the manufacturer of the second communication device.

11. The method of claim 8, wherein the communication network is at least one of a Universal Mobile Telecommunications System (UMTS) access network, Global System for Mobile Communications (GSM) access network, Worldwide Interoperability for Microwave Access (WiMAX), Code Division Multiple Access (CDMA) 2000, Next Generation Networks (NGN) and Long Term Evolution (LTE) access technology for communication.

12. The method of claim 8, wherein the communication network supports a Universal Mobile Telecommunications System (UMTS) access technology and Long Term Evolution (LTE) access technology for communication.

13. The method of claim 12, wherein the first communication device communicates with the communication network using UMTS access technology and the second communication device communicates with the communication network using LTE access technology.

14. The method of claim 8, wherein generating a key specific to the second communication device using second communication device identity and keys derived during authentication procedures comprises:
   receiving an authentication request from the communication network for authentication of the second communication device;
   forwarding the authentication request to the first communication device to receive authentication parameters;
   receiving the authentication parameters associated with establishing communication from the first communication device;
   sending the authentication parameters to the communication network after perfataining authentication procedures with the communication network; and
   deriving, second communication device specific keys associated with the authentication procedures.

15. An apparatus configured to establish communication between a plurality of communication devices and a communication network using a single subscription by a first communication device, the communication network is a wireless or wired network, the apparatus comprising:
   a transceiver configured to:
      receive a first request from a second communication device to get a subscription identity and capabilities of a subscription associated with the first communication device for accessing the communication network;
      send the first request to a Universal Subscriber Identity Module (USIM) associated with the first communication device; and
      receive a response from the USIM including a subscription identity and the capabilities of the subscription; and
   a processor configured to:
      generate a unique key for the second communication device based on the response received from the USIM; and
      send the response along with the generated unique key to the second communication device.

16. The apparatus of claim 15, wherein the first communication device is further configured to authenticate the first communication device mutually with the communication network on behalf of the plurality of communication devices, and wherein authenticating with the communication network informs the network about the plurality of communication devices that are associated with the first communication device for communicating with the communication network.

17. The apparatus of claim 15, wherein the first communication device is at least one of a mobile communication terminal, a fixed communication terminal and a gateway capable of accessing the communication network and the second communication device is at least one of an electronic device or machine type that is capable of accessing the communication network.

18. The apparatus of claim 15, wherein a device identifier (ID) of the second communication device is an International Mobile Equipment Identity (IMEI) number or a Medium Access Control (MAC) address or a unique ID assigned by the manufacturer of the second communication device.

19. The apparatus of claim 15, wherein the communication network is at least one of a Universal Mobile Telecommunications System (UMTS) access network, Global System for Mobile Communications (GSM) access network, Worldwide Interoperability for Microwave Access (WiMAX), Code Division Multiple Access (CDMA) 2000, Next Generation Networks (NGN) and Long Tei in Evolution (LTE) access technology for communication.

20. The apparatus of claim 15, wherein the communication network supports a Universal Mobile Telecommunications System (UMTS) access technology and Long Term Evolution (LTE) access technology for communication.

21. The apparatus of claim 20, wherein the first communication device communicates with the communication network using UMTS access technology and the second communication device communicates with the communication network using LTE access technology.

22. An apparatus configured to establish communication between a plurality of communication devices and a communication network using a single subscription by a second communication device, the communication network is a wireless or wired network, the apparatus comprising:
   a transceiver configured to:
      send a request to a first communication device to get a subscription identity and capabilities of a subscription associated with first communication device for accessing the communication network; and
      receive a response includes a subscription identity and the capabilities of the subscription from the first communication device; and
   a processor configured to:
      establish a radio communication channel between the second communication device and the communication network based on the subscription identity received in the response;
      generate a key specific to the second communication device using second communication device identity and keys derived during authentication procedures; and
      establish a secure communication between the second communication device and the communication network using the subscription of the first communication device based on the generated key specific to the second communication device.

23. The apparatus of claim 22, wherein the first communication device is at least one of a mobile communication terminal, a fixed communication terminal and a gateway capable of accessing the communication network and the second communication device is at least one of an electronic device or machine type that is capable of accessing the communication network.

24. The apparatus of claim 22, wherein a device identifier (ID) of the second communication device is an International Mobile Equipment Identity (MEI) number or a Medium Access Control (MAC) address or a unique ID assigned by the manufacturer of the second communication device.

25. The apparatus of claim 22, wherein the communication network is at least one of a Universal Mobile Telecommunications System (UMTS) access network, Global System for Mobile Communications (GSM) access network, Worldwide Interoperability for Microwave Access (WiMAX), Code Division Multiple Access (CDMA) 2000, Next Generation Networks (NGN) and Long Term Evolution (LTE) access technology for communication.

26. The apparatus of claim 22, wherein the communication network supports a Universal Mobile Telecommunications System (UMTS) access technology and Long Term Evolution (LTE) access technology for communication.

27. The apparatus of claim 26, respectively, wherein the first communication device communicates with the communication network using UMTS access technology and the second communication device communicates with the communication network using LTE access technology.

28. The apparatus of claim 22, wherein in generating the key specific to the second communication device using second communication device identity and the keys derived during the authentication, the processor is further configured to:
   receive an authentication request from the communication network for authentication of the second communication device;
   forward the authentication request to the first communication device to receive authentication parameters;
   receive the authentication parameters associated with establishing communication from the first communication device;
   send the authentication parameters to the communication network after performing authentication procedures with the communication network; and
   derive second communication device specific keys associated with the authentication procedures.

* * * * *